United States Patent
Hess et al.

(10) Patent No.: US 9,231,719 B2
(45) Date of Patent: Jan. 5, 2016

(54) METHOD AND APPARATUS FOR MULTIPLEXED TIME ALIGNED ANALOG INPUT SAMPLING

(71) Applicant: Hamilton Sundstrand Corporation, Windsor Locks, CT (US)

(72) Inventors: Gary L. Hess, Enfield, CT (US); James Saloio, Ludlow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 262 days.

(21) Appl. No.: 13/795,815

(22) Filed: Mar. 12, 2013

(65) Prior Publication Data

US 2014/0269775 A1  Sep. 18, 2014

(51) Int. Cl.
*H04J 3/02* (2006.01)
*G08C 15/00* (2006.01)
*H04Q 9/00* (2006.01)

(52) U.S. Cl.
CPC . *H04J 3/02* (2013.01); *G08C 15/00* (2013.01); *H04Q 9/00* (2013.01)

(58) Field of Classification Search
None
See application file for complete search history.

(56) References Cited

U.S. PATENT DOCUMENTS

| | | | |
|---|---|---|---|
| 4,882,614 A | | 11/1989 | Kageyama et al. |
| 6,115,654 A | * | 9/2000 | Eid et al. ............... 701/29.8 |
| 6,591,171 B1 | * | 7/2003 | Ammar et al. ............ 701/16 |
| 7,149,654 B2 | | 12/2006 | Ramsdale et al. |
| 7,432,836 B2 | | 10/2008 | Games |
| 7,688,241 B2 | | 3/2010 | Barrenscheen |
| 7,817,070 B2 | | 10/2010 | Games |
| 7,977,936 B2 | | 7/2011 | Lillestolen et al. |
| 8,140,242 B2 | | 3/2012 | Cloft |
| 2003/0127071 A1 | * | 7/2003 | Sauler et al. ............ 123/406.29 |
| 2013/0053983 A1 | * | 2/2013 | Lifshitz ..................... 623/43 |
| 2013/0158944 A1 | * | 6/2013 | Hwang et al. ............ 702/150 |
| 2013/0194844 A1 | * | 8/2013 | Harrison et al. ............ 363/89 |

FOREIGN PATENT DOCUMENTS

EP  2106058  9/2009

* cited by examiner

Primary Examiner — Jason Mattis
Assistant Examiner — James P Duffy
(74) Attorney, Agent, or Firm — Carlson, Gaskey & Olds, P.C.

(57) ABSTRACT

A sensor system includes a first sensor and a second sensor and a multiplexor having at least two multiplexer inputs connected to the sensors. The output of the multiplexor is connected to a time correlation logic circuit via at least a signal conditioning and anti-aliasing filter, and the output of the time correlation logic is a time correlated sensor reading of the first and second sensor.

20 Claims, 5 Drawing Sheets

METHOD AND APPARATUS FOR MULTIPLEXED TIME ALIGNED ANALOG INPUT SAMPLING

TECHNICAL FIELD

The present disclosure relates generally to multiplexed sensor arrangements, and more particularly to a multiplexed sensor arrangement for time aligned sensor readings.

BACKGROUND OF THE INVENTION

Aircraft engine systems, such as those used in commercial aircraft, utilize multiple sensors to check engine properties during operation. The sensors transmit corresponding sensor readings to a signal processor/controller that interprets the sensor signal and determines how to respond. The signal processors/controllers are often located remote from the engine in which the sensors are located, and the sensor signals are transmitted over lengthy signal wires to reach the signal processor/controller.

In order to reduce weight and costs of the aircraft, the signals of analog sensors are multiplexed together at the engine itself and converted to digital signals. By multiplexing the signals together, only a single signal wire is required to carry the sensor signals from multiple sensors to the signal processor/controller. The multiplexing is performed by a multiplexor located in local proximity to the sensors.

In some engines, sensor readings are required to be time correlated with each other. In such a case, the signal processor/controller needs simultaneous information from each sensor. Due to the nature of multiplexing, however, a multiplexed signal alternates between each of the sensor signals that have been multiplexed together, such that the signal processor/controller only receives a single sensor signal value at any given time. As a result, time correlated sensor signals are not transmitted over multiplexed sensor transmissions lines.

SUMMARY OF THE INVENTION

Disclosed is a sensor system including a first sensor and a second sensor, a multiplexor having at least two multiplexer inputs, wherein a first multiplexer input is connected to an output of the first sensor and the second multiplexer input is connected to an output of the second sensor, wherein an output of the multiplexor is connected to a time correlation logic circuit via at least a signal conditioning and anti-aliasing filter, wherein an output of the time correlation logic circuit is connected to an input of a signal processor and wherein said output of said time correlation logic is a time correlated sensor reading of said first and second sensor.

Also disclosed is a method for time correlating a multiplexed signal including the steps of: receiving a multiplexed signal including at least two sensor signals, determining a value representative of a currently passed value of the multiplexed signal at time t, determining an average value representative of a non-currently passed value of the multiplexed signal at time t, combining the currently passed value and the average value representative of the non-currently passed value at time t, thereby determining a time correlated sensor value at time t.

Also disclosed is a time correlated multiplexed sensor arrangement for an aircraft comprising including a first sensor and a second sensor, a multiplexor having at least two multiplexer inputs, wherein a first multiplexer input is connected to an output of the first sensor and the second multiplexer input is connected to an output of the second sensor, wherein an output of the multiplexor is connected to a time correlation logic circuit via at least a signal conditioning and anti-aliasing filter, wherein an output of the time correlation logic circuit is connected to an input of a signal processor and wherein said output of said time correlation logic is a time correlated sensor reading of said first and second sensor.

These and other features of the present invention can be best understood from the following specification and drawings, the following of which is a brief description.

DETAILED DESCRIPTION OF AN EMBODIMENT

Figure 1:
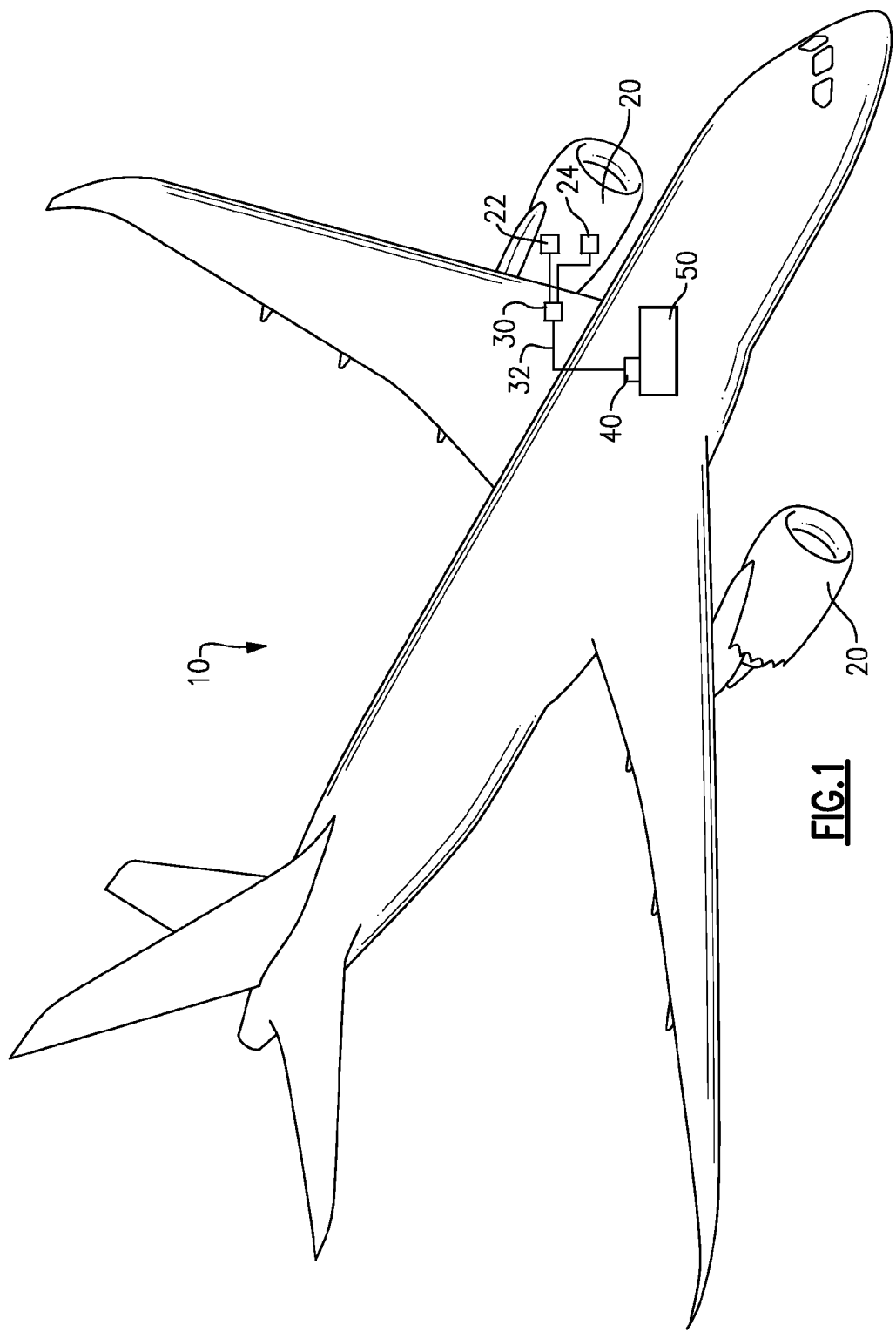
FIG. 1 schematically illustrates an aircraft including a time correlated multiplexed sensor arrangement.

FIG. 1 illustrates an aircraft 10 including turbine engines 20. Included within the turbine engines 20 are multiple sensors 22, 24. Although only two sensors are illustrated for explanatory purposes, it is understood that many additional sensors are included in practical applications of turbine engines 20 and aircraft 10 designs. Each of the sensors 22, 24 output a sensor signal to a multiplexor 30 that is located in close proximity to the sensors 22, 24.

The multiplexor 30 combines the sensor signals into a single signal using known multiplexing techniques, and transmits the signal to a signal processor 50, such as a controller via a multiplexed signal transmission line 32. The multiplexed signal transmission line 32 connects to the signal processor 50 via a signal conditioning block 40. In some examples the signal conditioning block 40 also includes an analog to digital converter, ensuring that the signal processor 50 receives digital signals that can be properly interpreted.

In some sensor systems, the readings from the sensors 22, 24 need to be time correlated for proper operation of the controller. In such systems a time correlation logic circuit is utilized to time correlate the multiplexed data received by the signal processor 50. The time correlation logic circuit is located between the signal conditioning block 40 and the signal processor 50 and utilizes digital logic to time correlate the sensor signals. The time correlation circuit can be either a hardware based digital logic circuit, or a software based digital logic signal processing program.

Figure 2:
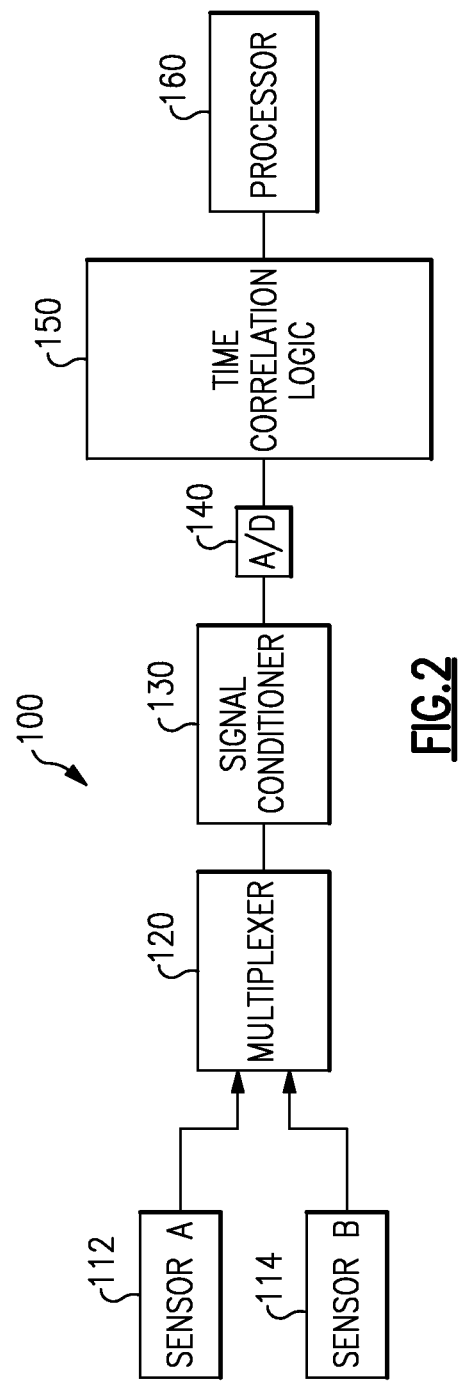
FIG. 2 schematically illustrates the sensor arrangement of FIG. 1.

FIG. 2 illustrates a sensor arrangement 100 for sensors 112, 114 where the sensors 112, 114 are sensing time correlated data. Each of the sensors 112, 114 transmits an independent sensor signal to a multiplexer 120. The multiplexer 120 multiplexes the sensor signals into a single signal using known multiplexor techniques, and transmits the multiplexed signal to a signal conditioner 130. Once conditioned the signal is converted into a digital signal in an analog to digital converter 140 and passed to a time correlation logic circuit 150.

The time correlation logic circuit 150 reads the multiplexed sensor signals and determines a time correlated sensor signal including time correlated sensor information from both sensors 112, 114. The time correlation logic circuit 150 utilizes known logic circuits to time correlate the sensor data according to the method described below with regards to FIGS. 4-6.

Once the multiplexed sensor signal has been time correlated, the time correlation logic circuit 150 passes the time correlated sensor signal to a signal processor 160, such as a controller, which then interprets the sensed data and causes the engine to respond appropriately. In some examples, such as the example illustrated in FIG. 1, the signal conditioner 130 is located at the signal processor 160.

Figure 3:
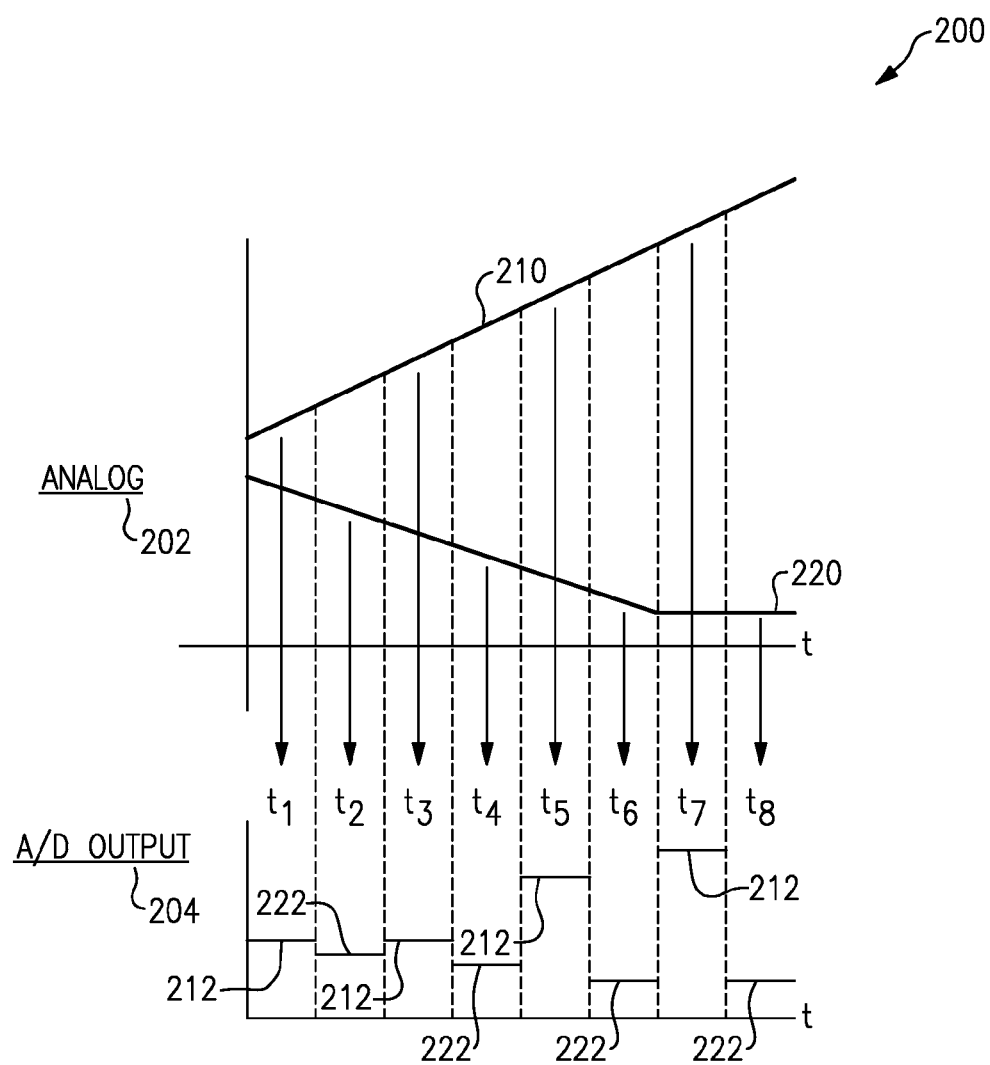
FIG. 3 is a graph of analog sensor information and multiplexed data.

FIG. 3 is a graph 200 illustrating analog sensor signals 210, 220 on an analog graph portion 202 and multiplexed sensor signals 212, 222 on an analog to digital converter output graph portion 204. In order to multiplex the signals 210, 220, the multiplexor 120 alternates which signal is passed at each time period $t_1$-$t_8$. Each of the time periods $t_1$-$t_8$ is the same length of time with the length being determined based on the needs and specification of the multiplexor 120. In the illustrated example, the analog sensor signal 210 from the first sensor 112 is passed as a multiplexed sensor value 212 at $t_1$, $t_3$, $t_5$, and $t_7$. Similarly, the analog sensor value from the second sensor 114 is passed as a multiplexed sensor value 214 at $t_2$, $t_4$, $t_6$, and $t_8$.

As can be seen from the multiplexor output signal, shown on the analog to digital output graph 204 only one analog sensor signal 210, 220 is passed to the signal processor 160 any given time $t_1$-$t_8$, absent time correlation. The time correlation circuit 150 introduces a time delay and combines past and future values of the sensor signal 210, 220 that is not currently being passed by the multiplexed signal to determine a time correlated non-passed sensor value. The time correlated non-passed sensor value is combined with the passed sensor value to determine time correlated sensor signal. The time correlated sensor signal is then passed to the signal processor 160.

Figure 4:
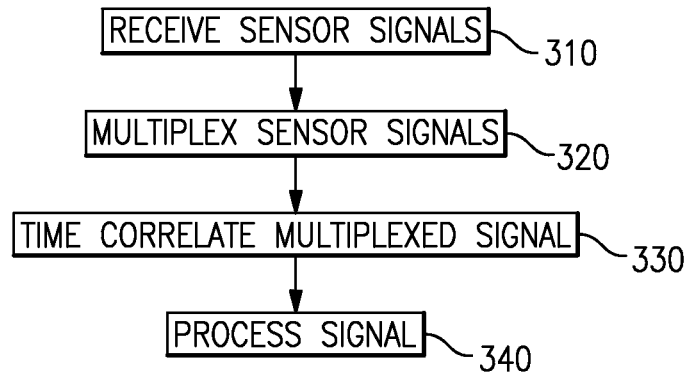
FIG. 4 is a flowchart of a general process for operating the sensor arrangement of FIG. 2.

FIG. 4 illustrates the time correlation process performed by the time correlation logic circuit 150 illustrated in FIG. 2. Initially, the signals from the sensors 112, 114 are received at the multiplexer 120 in a "receive sensor signals" step 310. The multiplexer 120 multiplexes the two sensor signals 210, 220 into a single multiplexed signal in a "multiplex sensor signals" step 320. The sensor signals 210, 220 are multiplexed together using standard multiplexer techniques. While the above described example utilizes only two sensors, it is understood that additional sensors could be multiplexed into the same signal and achieve the same benefits.

Figure 5:
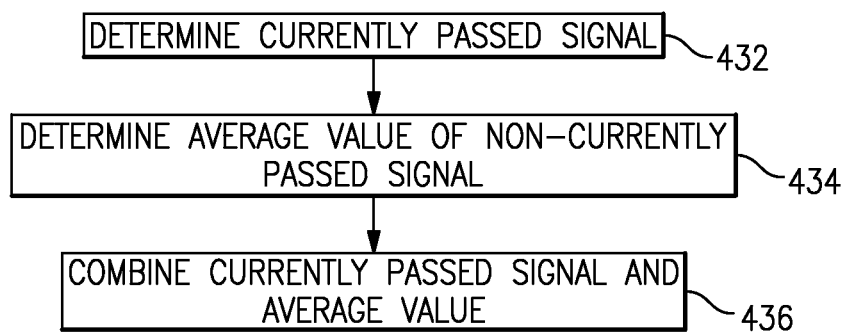
FIG. 5 is a flowchart of a first time correlation process for use in the process of FIG. 4.

Once the signal has been multiplexed, it is passed through a signal conditioner 130 and an analog to digital converter 140 that converts the multiplexed signal into a digital signal that is readable by a signal processor 160, such as an engine controller. The digital multiplexed signal is time correlated in a time correlation logic circuit 150, prior to being passed to the signal processor 160, in a "time correlate multiplexed signal" step 330. An example process for performing the time correlate multiplexed signal step 330 is illustrated in FIG. 5 and described below. Once time correlated, the time correlated multiplexed signal is output from the time correlation circuit 150 and provided to the signal processor 160 in a "Process signal" step 340.

With continued reference to FIGS. 2 and 3, FIG. 5 illustrates a process by which the multiplexed sensor signals are time correlated to generate time correlated sensor information. Initially, the instantaneous value of the currently passed sensor for the time period is determined in a "determine currently passed signal" step 432. For example, if the current time frame is $t_5$, the instantaneous value of the currently passed sensor signal 210, 222 is the actual value of the multiplexed signal, and corresponds to the actual value of the analog sensor signal 210 for the first analog sensor 112.

Once the currently passed value is determined, the time correlation logic circuit 150 determines an average value of the non-passed sensor signal 220 in a "determine average value of non-passed sensor signal" step 434. To determine the average value of the non-passed sensor signal, the time correlation circuit 150 sums the value of the multiplexed signal from the previous time period ($t_4$) and the next time period ($t_6$) and divides the sum by 2. Utilization of the average value of the non-passed sensor signal 210, 220 necessarily introduces a time delay between the sensors and the receipt of the time correlated sensor signal at the signal processor.

In alternate configurations, additional time steps can be utilized. In one example, the time correlation logic circuit 150 extends two time periods from the current time period ($t_5$), and the average value of the non-currently passed signal is the sum of $t_2$, $t_4$, $t_6$, and $t_8$ divided by four. The number of time periods utilized to determine the average of the non-currently passed value can be increased beyond four in a similar manner with the number of adjacent values to be utilized being determined based on the specifications of the particular implementation.

Once the average value of the non-passed sensor signal is determined, the process combines the currently passed signal and the average value signal in a "combine currently passed signal and average value signal" step 436. The summation combines the two values, resulting in a single time correlated sensor output that can be received by the signal processor 160. The time correlation process illustrated In FIG. 5, and described above, results in time correlated signal according to the following equation: $C_n = (A_{(n-1)} + A_{(n+1)})/2 + B_n$. Where $C_n$ is the time correlated signal value, $B_n$ is the currently passed value of the multiplexed signal, and $(A_{(n-1)} + A_{(n+1)})/2$ is the average value of the non-currently passed sensor signal.

While the above described time correlation works well for linear sensed values, it is understood that sensor signals during acceleration or deceleration can include non-linear slopes requiring an alternate time correlation logic circuit 150.

Figure 6:
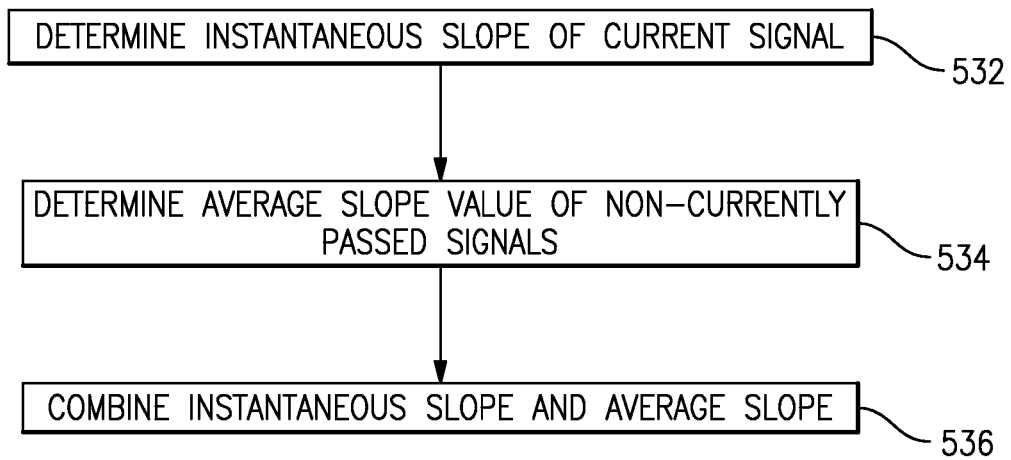
FIG. 6 is a flowchart of an alternate time correlation process for use in the process of FIG. 4.

FIG. 6 illustrates a process by which the time correlation logic circuit 150 compensates for acceleration or deceleration. Initially, the process determines the instantaneous slope of the currently passed sensor signal on the multiplexed signal in a "determine instantaneous slope of current signal" step 532. Once the instantaneous slope has been determined, the process determines an average slope value of non-currently passed signals in a "determine average slope value of non-currently passed signals" step 534. The average slope value is determined in a similar manner to the determination made in the "determine average value of non-currently passed signal" step 434 described above with regards to FIG. 5, with the rate of change of the non currently passed signal replacing the actual value of the non-currently passed signal. Similarly, once the average value has been determined, the process combines the instantaneous slope and average slope values from the previous steps 532, 534 to form a single combined time correlated output value in a "combine instantaneous slope and average slope" step 536.

Thus, in order to compensate for the changing values during acceleration or deceleration, the process described in FIG. 6 utilizes the first derivative of each of the sensor signals 210, 212 in place of the actual values. Similarly, if the acceleration or deceleration are changing in a non-linear fashion, the second derivative of each value can be utilized in the above process. By utilizing the slope during acceleration or deceleration, the time correlated sensor value output by the time correlation logic is based on a linear value and avoids undesirable distortions.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A sensor system comprising:
    a first sensor and a second sensor;
    a multiplexor having at least two multiplexer inputs, wherein a first multiplexer input is connected to an output of said first sensor and said second multiplexer input is connected to an output of said second sensor;
    an output of said multiplexor is connected to a time correlation logic circuit via at least a signal conditioning and anti-aliasing filter, the time correlation logic circuit including logic circuitry operable to cause said time correlation logic circuit to perform the steps of determining a currently passed value of the multiplexed signal at time t, the currently passed value being an instantaneous value of one of the first sensor and the second sensor, determining an average value representative of a non-currently passed value of the multiplexed signal at time t, the average value of a non-currently passed value being an average output of the other of said first and second sensor, combining said currently passed value and said average value representative of said non-currently passed value at time t, thereby determining a time correlated sensor value at time t, and wherein the time correlated sensor value is an instantaneous value of one of the first sensor and the second sensor at time t and an average value of the other of the first sensor and the second sensor at time t;
    wherein an output of said time correlation logic circuit is connected to an input of a signal processor; and
    wherein said output of said time correlation logic is the time correlated sensor value.

2. The sensor system of claim 1, wherein said first sensor and said second sensor are analog sensors.

3. The sensor system of claim 2, wherein said output of said multiplexor is connected to said time correlation logic circuit via a signal conditioning and anti-aliasing filter in series with an analog to digital converter.

4. The sensor system of claim 1, wherein said time correlation logic circuit is hardware based.

5. The sensor system of claim 1, wherein said time correlation logic circuit includes an acceleration compensation logic circuit.

6. The sensor system of claim 1, wherein the currently passed value of the multiplexed signal is an instantaneous output of the first sensor, and the average value representative of a non-currently passed value is an average value of at least two outputs of the second sensor.

7. The sensor system of claim 6, wherein the at least two outputs of the second sensor include an instantaneous output of the second sensor in a previous time period and an instantaneous output of the second sensor in a future time period.

8. The sensor system of claim 7, wherein the at least two outputs of the second sensor include an instantaneous output of the second sensor in at least two previous time period and an instantaneous output of the second sensor in at least two future time periods.

9. A method for time correlating a multiplexed signal comprising the steps of:
    receiving a multiplexed signal including at least a first sensor signal and a second sensor signal;
    determining a value representative of a currently passed value of the multiplexed signal at time t, the currently passed value being an instantaneous value of one of the first sensor signal and the second sensor signal;
    determining an average value representative of a non-currently passed value of the multiplexed signal at time t, the average value of a non-currently passed value being an average output of the other of said first sensor signal and second sensor signal;
    combining said currently passed value and said average value representative of said non-currently passed value at time t, thereby determining a time correlated sensor value at time t; and
    passing the time correlated sensor value to a signal processor configured to interpret the time correlated sensor value, thereby simultaneously passing a value representative of the first sensor signal at time t and a value representative of the second sensor signal at time t to said processor; and
    generating control signals for an engine using said processor based at least in part on the simultaneously passed values.

10. The method of claim 9, wherein said step of determining an average value representative of a non-currently passed multiplexed signal at time t further comprises summing at least an immediately prior passed value of said non-currently passed multiplexed signal at time t−1 and an immediately post passed value of said non-currently passed multiplexed signal at time t+1, thereby determining an intermediate sum value.

11. The method of claim 10, wherein said step of determining an average value representative of a non-currently passed multiplexed signal at time t further comprises dividing said intermediate sum value by the number of summed values, thereby determining the average value representative of said non-currently passed multiplexed signal for time t.

12. The method of claim 9, wherein said step of determining an average value representative of a non-currently passed multiplexed signal at time t further comprises summing at least a slope of an immediately prior passed value of said non-currently passed multiplexed signal at time t−1 and a slope of an immediately post passed value of said non-currently passed multiplexed signal at time t+1, thereby determining an intermediate sum value.

13. The method of claim 12, wherein said step of determining an average value representative of a non-currently passed multiplexed signal at time t further comprises dividing said intermediate sum value by the number of summed values, thereby determining the average value representative of said non-currently passed multiplexed signal for time t.

14. The method of claim 12, wherein average value representative of a non-currently passed multiplexed signal at time t is a derivative with respect to time of the non-currently passed multiplexed signal.

15. The method of claim 14, wherein said value representative of a currently passed value of the multiplexed signal at time t is an instantaneous derivative of the currently passed value of the multiplexed signal.

16. A time correlated multiplexed sensor arrangement for an aircraft comprising:
    at least a first sensor and a second sensor;
    a multiplexor having at least two multiplexer inputs, wherein a first multiplexer input is connected to an output of said first sensor and said second multiplexer input is connected to an output of said second sensor;

an output of said multiplexor is connected to a time correlation logic circuit via at least a signal conditioning and anti-aliasing filter;

said time correlation logic circuit includes logic circuitry operable to cause said time correlation logic circuit to perform the steps of determining a currently passed value of the multiplexed signal at time t, the currently passed value being an instantaneous value of one of the first sensor and the second sensor, determining an average value representative of a non-currently passed value of the multiplexed signal at time t, the average value of a non-currently passed value is an average output of the other of said first and second sensor, combining said currently passed value and said average value representative of said non-currently passed value at time t, thereby determining a time correlated sensor value at time t, and the time correlated sensor value is an instantaneous value of one of the first sensor and the second sensor at time t and an average value of the other of the first sensor and the second sensor at time t;

wherein an output of said time correlation logic circuit is connected to an input of a signal processor; and wherein said output of said time correlation logic is the time correlated sensor value.

17. The time correlated multiplexed sensor arrangement for an aircraft of claim 16, wherein said first sensor and said second sensor are analog sensors.

18. The time correlated multiplexed sensor arrangement for an aircraft of claim 17, wherein said output of said multiplexor is connected to said time correlation logic circuit via a signal conditioning and anti-aliasing filter in series with an analog to digital converter.

19. The time correlated multiplexed sensor arrangement for an aircraft of claim 16, wherein said time correlation logic circuit is hardware based.

20. The time correlated multiplexed sensor arrangement for an aircraft of claim 16, wherein said time correlation logic circuit includes an acceleration compensation logic circuit.

* * * * *